United States Patent [19]

Smay et al.

[11] Patent Number: 5,080,307
[45] Date of Patent: Jan. 14, 1992

[54] SPACECRAFT EARTH-POINTING ATTITUDE ACQUISITION METHOD

[75] Inventors: John W. Smay, Redondo Beach; John F. Yocum, Rancho Palos Verdes; William F. Hummel, Los Angeles, all of Calif.

[73] Assignee: Hughes Aircraft Company, Los Angeles, Calif.

[21] Appl. No.: 522,873

[22] Filed: May 14, 1990

[51] Int. Cl.$^5$ .............................. B64G 1/24; B64G 1/36
[52] U.S. Cl. ..................................... 244/164; 244/171
[58] Field of Search ..................... 244/158 R, 164-171; 364/434, 459

[56] References Cited

U.S. PATENT DOCUMENTS

| | | | |
|---|---|---|---|
| 4,306,692 | 12/1981 | Kaplan et al. | 244/165 |
| 4,358,076 | 11/1982 | Large et al. | 244/164 |
| 4,752,884 | 6/1988 | Slafer et al. | 364/434 |
| 4,909,460 | 3/1990 | Mouve et al. | 244/164 |
| 4,927,101 | 5/1990 | Blancke | 244/164 |

Primary Examiner—Galen Barefoot
Attorney, Agent, or Firm—Robert A. Westerlund; Steven M. Mitchell; Wanda K. Denson-Low

[57] ABSTRACT

A method for acquiring Earth-pointing attitude of a three-axis, body-stabilized spacecraft orbiting the Earth in a prescribed orbit plane, e.g. a geosynchronous communications satellite, including the steps of aligning the roll axis of the spacecraft with the sun line (which is the vector directed from the spacecraft to the Sun); then, orienting the spacecraft such that the angle formed between the yaw axis and the sun line is equal to the Earth-Sun angle (which is the angle formed between the sun line and a vector directed from the origin of the spacecraft internal coordinate system to the Earth); then, orienting the spacecraft such that the yaw axis is aligned with the center of the Earth; and finally, rotating the spacecraft about its yaw axis until its pitch axis is oriented at a desired attitude relative to the orbit plane, e.g., normal to the orbit plane, to thereby complete acquisition of the Earth-pointing attitude.

8 Claims, 3 Drawing Sheets

SPACECRAFT EARTH-POINTING ATTITUDE ACQUISITION METHOD

FIELD OF THE INVENTION

The present invention relates to a novel technique for controlling the attitude of body-stabilized spacecraft, e.g. a satellite, in such a manner as to achieve rapid and accurate initial acquisition or re-acquisition of Earth-pointing attitude.

BACKGROUND OF THE INVENTION

There are many presently available spacecraft attitude determination and control systems for orienting a spacecraft in the proper orbital position relative to the Earth, and for maintaining this proper orbital position. For a detailed explanation of the principles of design, construction, and operation of spacecraft attitude determination and control systems, reference may be made to a reference book entitled "Spacecraft Attitude Determination and Control," edited by James R. Wertz, and published by D. Reidel Publishing Company (1986). In general, such systems must include facilities for determining the attitude of the spacecraft on a continuous, real-time basis, and facilities responsive to the determining facilities for controlling the attitude of the spacecraft, in order to reorient the spacecraft from its determined attitude to its proper or desired attitude, which is generally a predetermined orientation relative to the Earth, in the realm of spacecraft, e.g. satellites, which orbit around the Earth. The attitude determining facilities generally include a variety of sensors which function to sense or detect various celestial objects and to generate electrical signals in response thereto. Sensors that are widely employed include sun sensors, star sensors, earth (horizon) sensors, and magnetometers. The attitude determining facilities may also include various types of gyroscopes, which are, basically speaking, instruments which use a rapidly spinning mass to sense and respond to changes in the inertial orientation of the spacecraft. The attitude determining facilities also include a computer for processing the output signals generated by the sensors and/or gyroscopes, in accordance with suitable attitude determination software. The computer is typically further provided with ephemeris data which is normally obtained from spacecraft ephemeris files, such as those generated and maintained at the Goddard Space Flight Center using the Goddard Trajectory Determination System (GTDS). "Ephemeris" is a term of art which refers to a numerical table listing the position of a spacecraft at regular intervals throughout its orbit. Definitive spacecraft orbit information can be easily formulated for any particular spacecraft, and the resultant ephemeris stored, e.g. on magnetic disk or tape, or directly in computer memory. In any event, the computer functions to process both the sensor-generated and ephemeris data to determine the precise attitude of the spacecraft at any given moment.

The computer further functions to compare the determined attitude to the desired attitude and to generate error or control signals which are utilized by the attitude controlling facilities to reorient the spacecraft from its determined attitude to its desired attitude. The attitude controlling facilities include torque generators which function to apply control torques to the spacecraft (e.g. about the x,y, and z-axes of the internal spacecraft coordinate system), in response to the control signals, in order to correct or adjust the attitude of the spacecraft. Representative torque generators which are commonly employed include hot or cold gas jets, gas and ion thrusters, reaction wheels, momentum wheels, magnetic coils, and control moment gyros (CMG'S).

As is well-known in the field of spacecraft systems, the attitude determination computer may be either ground-based or located onboard the spacecraft. In general, if the attitude determination and control system is located completely onboard the spacecraft, and acquisition and maintenance of the proper spacecraft attitude requires essentially no ground support, the system is considered to be autonomous. If the system is partially controlled by onboard control electronics, and further partially controlled from a ground support/control station, then the system is said to be semi-autonomous. If the system is entirely controlled from a ground station, with or without the need for human intervention (i.e. open loop or closed loop) the system is considered ground controlled. Typically, the system is semi-autonomous, with the sensors and associated onboard electronics generating spacecraft attitude data which is telemetered to a ground tracking station which relays the data to a receiving station (e.g., an Operations Control Center at Goddard Space Flight Center) which houses the attitude determination computer, which processes this data in the general manner described above, and generates command signals which are uplinked to the torque generator control electronics aboard the spacecraft, in order to thereby facilitate the generation of the appropriate control torques to achieve the desired/proper spacecraft attitude.

In general, an attitude maneuver in which the initial (i.e. pre-maneuver) attitude is unknown is referred to as an attitude acquisition maneuver. Initial attitude acquisition is required when the spacecraft is first put into orbital operation upon deployment from a launch vehicle. Attitude stabilization is the process of maintaining an existing attitude relative to some external frame of reference. Normally, attitude stabilization is performed by the attitude control system in a fine servo, closed loop mode of operation, which is commonly referred to as a normal, stationkeeping mode of operation. The attitude control system is generally capable of maintaining the operational attitude of the spacecraft within a prescribed operating range, which is generally limited by the resolution of the sensor hardware, e.g. by the field-of-view of the Earth or Sun sensors, and/or by the speed and accuracy of the servo control hardware, e.g. by the response time and accuracy of the thrusters. In any event, when this prescribed operating range is exceeded (e.g. due to disturbing torques), it again becomes necessary to perform an attitude acquisition maneuver, wherein the initial attitude of the spacecraft at the time this maneuver is initiated, is unknown. This procedure is commonly referred to as an attitude re-acquisition maneuver.

Attitude acquisition and re-acquisition maneuvers are generally performed by means of interrupting the normal, closed loop mode of operation of the attitude control system and thenceforth initiating a special attitude maneuver sequence under the control (or partial control) of a software package which is custom-designed for that particular spacecraft and its specified mission. This acquisition or re-acquisition mode of operation of the attitude control system can be thought of as a coarse servo mode of operation, which is utilized to orient the spacecraft in such a manner as to bring its attitude within the pull-in or capture range of the fine servo control software.

The present invention is primarily concerned with three-axis, body-stabilized spacecraft which are placed into an equatorial or "near-equatorial" orbit (e.g. 20 to 30 degrees above or below equatorial orbit) around the Earth, e.g. geosynchronous communications satellites. The attitude control system of three-axis, body-stabilized satellites must have torque generators capable of applying a torque about each of the roll, pitch, and yaw axes of the satellite, i.e. + or − pitch, + or − roll, and, + or − yaw, in order to be rendered capable of full attitude control. In the particular case of geosynchronous communications satellites, the desired attitude, sometimes referred to as the "Earth-pointing attitude," is attained when the yaw axis is directed toward the nadir (i.e. toward the center of the Earth); the pitch axis is directed toward the negative normal to the orbit plane; and, the roll axis is perpendicular to the other two axes such that unit vectors along the three axes have the relation $R^\wedge = P^\wedge \times Y^\wedge$. Thus, with the spacecraft in a circular orbit, the roll axis will be along the velocity vector, i.e. in the direction of motion of the spacecraft. In the realm of geosynchronous communications satellites, the ability to rapidly re-acquire Earth-pointing attitude whenever it is "lost" during the operational/service life of the satellite is of critical importance to the fundamental mission thereof, which is to provide uninterrupted voice, data, and/or broadcast video communications service. In addition, it should be readily appreciated that satellite downtime is very expensive, due to the high operating costs of satellites. Therefore, it is highly desirable to minimize the time required to re-acquire the proper Earth-pointing attitude whenever the normal, stationkeeping mode of operation of the satellite attitude control system is interrupted.

Although there are many known techniques for acquiring or re-acquiring the proper Earth-pointing attitude of three-axis, body-stabilized spacecraft, the most commonly employed technique, as is specifically taught by U.S. Pat. No. 4,358,076, issued to Lange et al., is a drawn or dusk acquisition technique, which can be briefly described as follows. Basically, three wide field-of-view (+ or −35 degrees X + or −60 degrees) sun sensors and a particular scan profile are used to locate the Sun and to then align the roll axis of the spacecraft with the sun line. Next, the roll axis is rotated about the sun line, thereby enabling a yaw axis symmetric Earth sensor field-of-view to encounter the Earth within 12 hours, by virtue of the fact that sun sensors are situated on both the + and − roll axes, thereby permitting acquisition of the desired Earth-pointing attitude at both dawn and dusk. Although this Earth-pointing attitude acquisition technique is simple, reliable, and cost-effective, the length of time required to achieve acquisition constitutes a significant shortcoming and disadvantage, due to the length of satellite downtime occasioned thereby. Although there are other known techniques for achieving rapid acquisition (e.g. in less than an hour), these techniques (e.g. star sensor techniques) invariably require very complex and expensive hardware and software for their execution, and are therefore less reliable and cost-effective than desirable for many applications.

Based upon the above and foregoing, it can be clearly seen that there presently exists a need for a simple, reliable, and cost-effective technique for rapidly acquiring the Earth-pointing attitude of a three-axis, body-stabilized satellite, to thereby eliminate the shortcomings and disadvantages associated with the presently known Earth-pointing attitude acquisition techniques.

It is the primary purpose and objective of the present invention to address and meet this need.

SUMMARY OF THE INVENTION

The present invention encompasses a method for acquiring Earth-pointing attitude of a three-axis, body-stabilized spacecraft, e.g. a zero momentum or momentum-biased satellite, orbiting around the Earth, e.g., in an equatorial or "near-equatorial" orbit plane. The method includes the steps of aligning the roll axis of the spacecraft with the sun line; then, orienting the spacecraft such that the angle between the yaw axis of the spacecraft and the sun line is equal to the Earth-Sun angle; then, orienting the spacecraft such that the yaw axis is aligned with the vector directed from the origin of the spacecraft internal coordinate system to the Earth; and finally, rotating the spacecraft about its yaw axis until the pitch axis of the spacecraft is oriented at a desired attitude relative to the orbit plane, e.g., normal to the orbit plane, to thereby complete acquisition of the Earth-pointing attitude.

DETAILED DESCRIPTION OF THE INVENTION

Because the present invention primarily resides in a method for maneuvering the orientation of a spacecraft, it is not necessary that a detailed description of the hardware for implementing this method be made herein, as the hardware itself is well-known in the art of spacecraft attitude determination and control systems. Accordingly, it should be understood that any convenient attitude control hardware configuration may be employed in the practice of the present invention, e.g., any of the systems described in the aforereferenced textbook entitled "Spacecraft Attitude Determination and Control", appropriate for the control of three-axis, body-stabilized spacecraft.

The first step of the Earth-pointing attitude acquisition method of the present invention is to maneuver the orientation of a three-axis, body-stabilized spacecraft 20, which may conveniently be of either the zero momentum or momentum bias type, such as to align the roll axis 21 thereof with the sun line 22, (which is a vector directed from the spacecraft 20 to the Sun), by any convenient technique. It is presently contemplated that the method of the present invention will have primary utility in conjunction with a spacecraft, e.g., a geosynchronous communications satellite, that is orbiting the Earth in an equatorial or "near-equatorial" orbit plane (e.g. 20-30 degrees above or below the equator), although the invention is not limited to this context. This first step will hereinafter be referred to as the sun acquisition step.

Figures 1, 2:
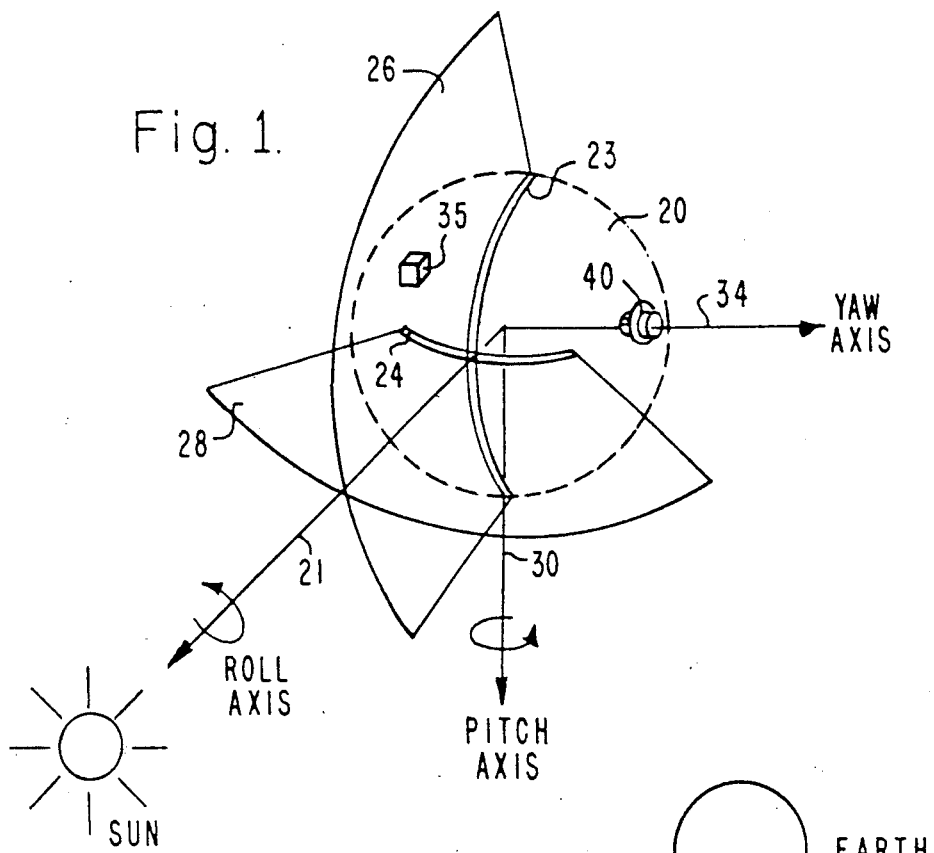
FIG. 1 is a diagrammatical illustration of the sun and earth sensor geometry employed in the presently contemplated best mode of carrying out the method of the present invention for acquiring a desired Earth-pointing attitude of a three-axis, body-stabilized spacecraft.
FIG. 2 is a vector diagram illustrating the Sun-Earth-spacecraft geometry which describes certain aspects of the method of the present invention.

A particular implementation of the sun acquisition step will now be described, with the understanding that this particular implementation of the sun acquisition step is not limiting to the overall method of the instant invention. More particularly, with particular reference now to FIG. 1, there can be seen a diagrammatical illustration of the sun sensor hardware configuration of the presently contemplated best mode of carrying out the method of the present invention for maneuvering the orientation of the spacecraft 20 for acquiring Earth-pointing attitude. More particularly, as is depicted in FIG. 1, two narrow-slit sun sensors 23, 24 are disposed in the pitch-roll and roll-yaw planes, respectively, of the spacecraft 20, to thereby provide corresponding narrow, planar, fan-shaped sun sensor fields-of-view(-FOV'S) 26, 28 situated respectively in the pitch-roll and roll-yaw planes of the spacecraft 20. This particular sun sensor configuration facilitates the particular implementation of the sun acquisition step of the overall method of the instant invention to be described below, by means of providing appropriate spacecraft attitude data to the spacecraft attitude determination and control system (not shown).

More particularly, the sun acquisition step of the method of the present invention may be conveniently executed by means of rotating the spacecraft 20 about its pitch axis 30 until the sun line 22 comes into the pitch-roll plane. Then, the spacecraft 20 is rotated about its yaw axis 34 until the sun line 22 comes into the roll-yaw plane. The sun acquisition step is terminated when the roll axis 21 is aligned with the sun line 22, i.e. with the sun line 22 aligned with the intersection of the pitch-roll and roll-yaw planes of the spacecraft 20, as is depicted in FIG. 1.

Figure 3:
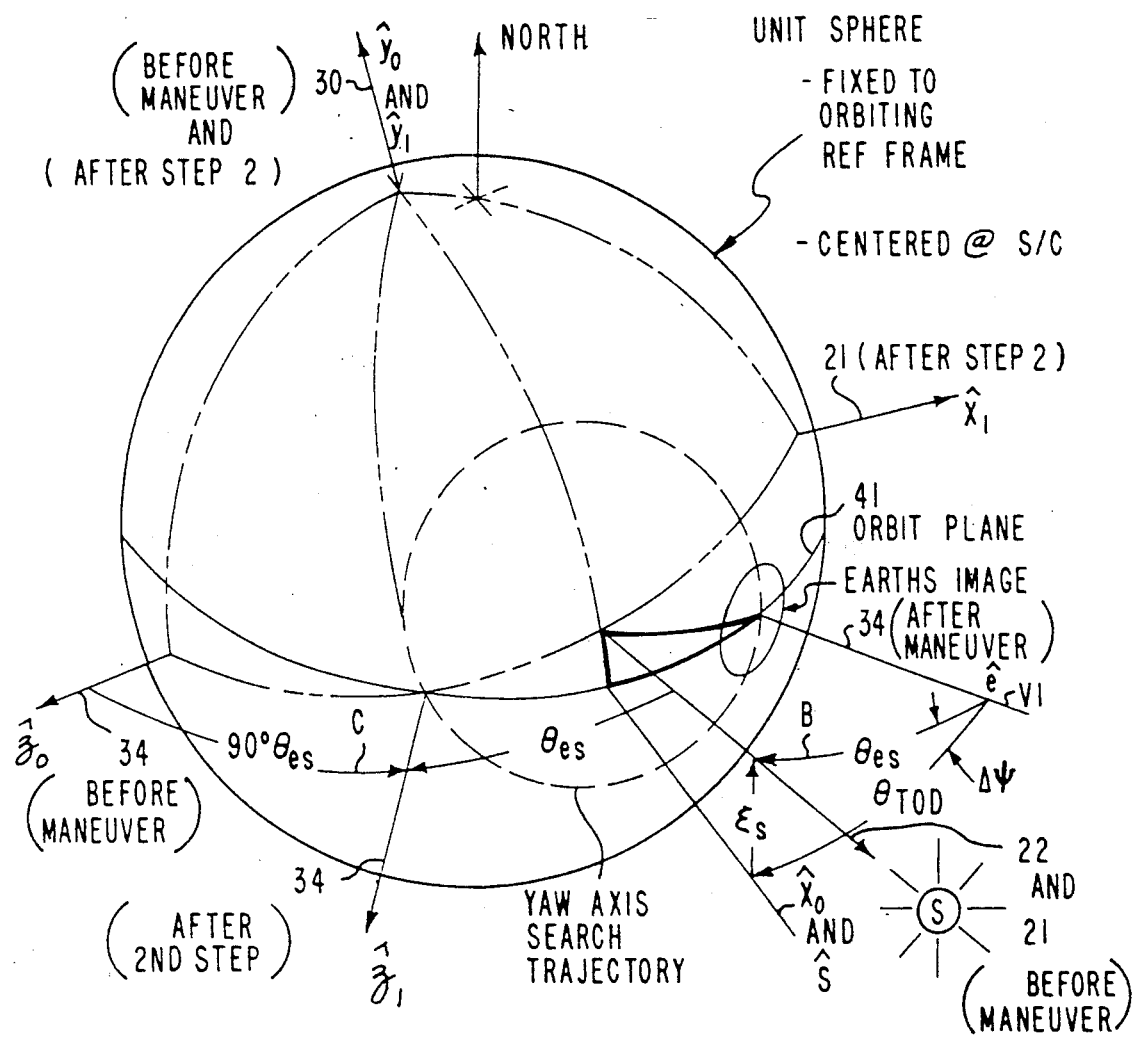
FIG. 3 is a spacecraft-centered spherical diagram illustrating spherical geometry which further describes certain aspects of the method of the present invention.
Figure 4:
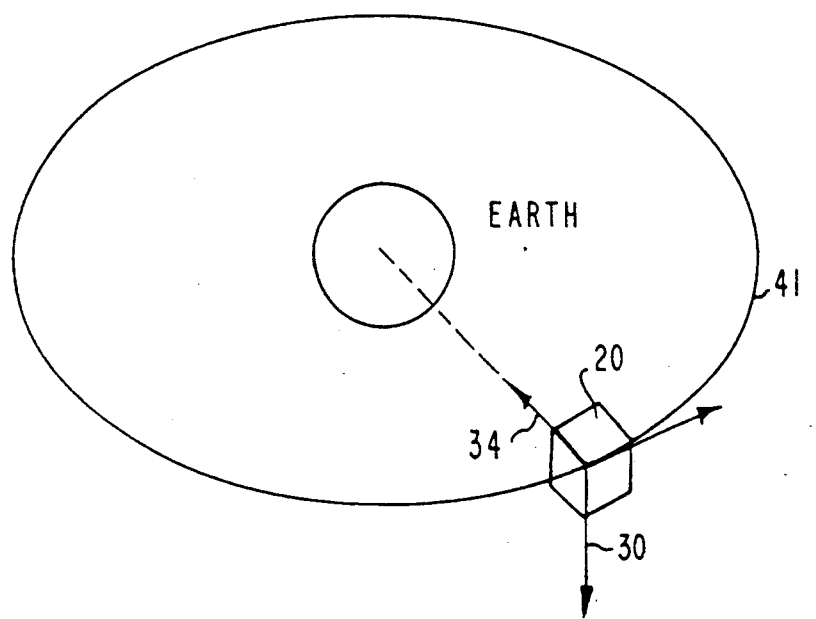
FIG. 4 is diagrammatical illustration of a spacecraft orbiting the Earth in an Earth-pointing attitude.

The second step of the Earth-pointing attitude acquisition method of the present invention is to orient the spacecraft 20 such that the angle A between the yaw axis 34 and the sun line 22 is equal to the Earth-Sun angle B, as can be seen in FIGS. 2 and 3. As is well-known in the art, the Earth-Sun angle is the angle formed between the sun line 22 and a vector V1 directed from the origin of the spacecraft roll, yaw, pitch (RPY) coordinate system to the Earth. The presently contemplated best mode of carrying out this second step of the overall method of the instant invention will now be described.

First of all, the Earth-Sun angle B at the time that the second step is initiated is determined on the basis of spacecraft and Earth ephemeris data and the spacecraft 20 body rates are nominally nulled (e.g. under gyro control, see FIG. 1) with the roll axis 21 aligned with the sun line 22. Then, the pitch axis 30 is slewed through an angle C equal to 90 degrees-B, in order to thereby move the yaw axis 34 to a position where the magnitude of angle A is substantially equal to the magnitude of angle B. This pitch slew maneuver positions the yaw axis 34 on a cone (not shown) of half-angle B from the Earth and further, moves the roll axis 21 out of alignment with the sun line 22 and a non-principal axis 39, hereinafter referred to as the search scan rotation axis, into alignment with the sun line 22.

The third step of the Earth-pointing attitude acquisition method of the present invention is to orient the spacecraft 20 such that the yaw axis 34 is aligned with the center of the Earth. Since the previous/second step positioned the yaw axis 34 on a cone of half-angle B from the Earth, then it can be readily appreciated that the above-defined third step may be simply executed by means of rotating the spacecraft 20 about the search scan rotation axis 39 while searching for the Earth with a yaw axis boresighted Earth sensor 40 (see FIG. 1) of any convenient type well-known in the art, to thereby impart a coning motion to the yaw axis 34, thereby ultimately providing an appropriate conical scan geometry. Because of the geometrical positioning of the spacecraft 20 occasioned by this procedure, it is guaranteed that the yaw axis 34 will encounter the Earth during a single rotation of the spacecraft 20 about the search scan rotation axis 39. Next, in order to lock the spacecraft 20 into the position whereby the yaw axis 34 is aligned with the center of the Earth (hereinafter referred to as the "Earth acquisition position"), the attitude positioning system (not shown) of the spacecraft 20 is utilized to null the coning motion of the yaw axis 34, in the conventional manner, when the Earth is sufficiently within the field-of-view of the Earth sensor(s). Then, the Earth sensor measurements of roll and pitch of the spacecraft 20 (which, of course, could be telemetered to a ground control station) are used by the attitude positioning system to center the yaw axis 34; i.e. to perfectly align the yaw axis 34 with the center of the Earth.

At this juncture, with the spacecraft 20 in its Earth acquisition position, the only remaining step is to rotate the spacecraft 20 about the yaw axis 34 until the pitch axis 30 is oriented at a desired attitude relative to the orbit plane 41, e.g., normal to the orbit plane 41, as is shown in FIG. 3, which depicts the final, Earth-pointing attitude of the spacecraft 20. The required rotation angle can be computed entirely from ephemeris data, without the use of attitude knowledge. At this point, the Earth-pointing attitude acquisition method/maneuver of the present invention is completed, and the spacecraft attitude control system is returned to its normal, stationkeeping mode of operation.

Although a presently contemplated best mode of carrying out the method of the present invention has been disclosed hereinabove, it should be clearly understood that many variations, modifications, and enhancements of the hereinpresented inventive concepts which may appear to those skilled in the art of spacecraft systems may still fall within the spirit and scope of the instant invention, which should be interpreted on the basis of the following claims.

What is claimed is:

1. In a three-axis, body-stabilized spacecraft having roll, pitch, and yaw axes, and orbiting around the Earth in an orbit plane, and wherein a first vector directed from the spacecraft to the Sun defines a sun line, a method for acquiring Earth-pointing attitude of the spacecraft, comprising the chronologically executed steps of:

aligning said roll axis of said spacecraft with said sun line;

orienting said spacecraft such that a first angle formed between said yaw axis and said sun line is equal to a second angle formed between said sun line and a second vector directed from said spacecraft to the Earth;

orienting said spacecraft such that said yaw axis is aligned with said second vector, by rotating said spacecraft about said sun line; and, rotating said spacecraft about said yaw axis until said pitch axis is oriented at a desired pitch axis angle with respect to said orbit plane, to thereby complete acquisition of said Earth-pointing attitude.

2. The method as set forth in claim 1, wherein said aligning step comprises the sub-steps of:
- rotating said spacecraft about said pitch axis until said sun line comes into a first plane defined by said pitch and roll axes; and then,
- rotating said spacecraft about said yaw axis until said sun line comes into a second plane defined by said roll and yaw axes, thereby aligning said roll axis with said sun line.

3. The method as set forth in claim 2, wherein said aligning step is implemented by means of employing a first narrow-slit sun sensor disposed in said first plane, and a second narrow-slit sun sensor disposed in said second plane, to thereby provide corresponding, narrow, planar, fan-shaped sun sensor fields-of-view situated respectively in said first and second planes.

4. The method as set forth in claim 2, wherein said first-recited orienting step comprises the sub-steps of:
- providing spacecraft and Earth ephemeris data;
- utilizing said spacecraft and Earth ephemeris data to determine the magnitude of said second angle;
- nominally nulling motion of said spacecraft about said roll, pitch, and yaw axes with said roll axis aligned with said sun line;
- slewing said pitch axis through a slew angle equal to 90 degrees minus the determined magnitude of said second angle, in order to thereby move said yaw axis to a position in said second plane where it forms a third angle with said sun line, such that the magnitude of said third angle is substantially equal to the magnitude of said second angle; and,
- wherein the above-recited sub-steps result in said yaw axis being positioned on a cone having a half-angle equal to said second angle, and further result in said roll axis being positioned out of alignment with said sun line, and a non-principal spacecraft axis being positioned in alignment with said sun line.

5. The method as set forth in claim 4, wherein said second-recited orienting step comprises the sub-steps of:
- rotating said spacecraft about said non-principal spacecraft axis, to thereby impart a coning motion to said yaw axis;
- utilizing a yaw axis boresighted Earth sensor to search for the Earth;
- in response to detection of the Earth by said Earth sensor, nulling said coning motion of said yaw axis; and then,
- finely adjusting the attitude of said spacecraft in such a manner as to align said yaw axis with said second vector.

6. The method as set forth in claim 5, wherein said orbit plane is an equatorial orbit plane.

7. The method as set forth in claim 5, wherein said orbit plane is a near-equatorial plane disposed no more than approximately 30 degrees in elevation from an equatorial orbit plane.

8. The method as set forth in claim 5, wherein said pitch axis angle is 90 degrees with respect to said orbit plane.

* * * * *